(12) United States Patent  
Gusler et al.

(10) Patent No.: US 8,140,981 B2
(45) Date of Patent: Mar. 20, 2012

(54) METHOD AND APPARATUS FOR ENHANCING INSTANT MESSAGING SYSTEMS

(75) Inventors: Carl P. Gusler, Austin, TX (US); Rick A. Hamilton, II, Charlottesville, VA (US); Harry Schatz, McLean, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 12/140,619

(22) Filed: Jun. 17, 2008

(65) Prior Publication Data

US 2008/0250335 A1    Oct. 9, 2008

Related U.S. Application Data

(62) Division of application No. 10/427,137, filed on Apr. 30, 2003, now Pat. No. 7,412,491.

(51) Int. Cl.
*G06F 13/00* (2006.01)
*G06F 15/00* (2006.01)

(52) U.S. Cl. ...................................... 715/753; 715/758
(58) Field of Classification Search .......... 715/751–753, 715/757–758, 772, 777, 759, 797
See application file for complete search history.

(56) References Cited

U.S. PATENT DOCUMENTS

| | | | |
|---|---|---|---|
| 5,617,541 A | 4/1997 | Albanese et al. | |
| 5,995,940 A | 11/1999 | Ramaley | |
| 6,212,548 B1 | 4/2001 | DeSimone et al. | |
| 6,301,609 B1 | 10/2001 | Aravamudan et al. | |
| 6,392,997 B1 | 5/2002 | Chen | |
| 6,430,602 B1 | 8/2002 | Kay et al. | |
| 6,430,604 B1 | 8/2002 | Ogle et al. | |
| 6,484,196 B1 | 11/2002 | Maurille | |
| 6,493,703 B1 | 12/2002 | Knight et al. | |
| 6,510,458 B1 | 1/2003 | Berstis et al. | |
| 6,557,027 B1 | 4/2003 | Cragun | |
| 6,594,693 B1 | 7/2003 | Borwankar | |
| 6,778,941 B1 | 8/2004 | Worrell et al. | |

(Continued)

OTHER PUBLICATIONS

USPTO office action for U.S. Appl. No. 10/427,137, U.S. Patent 7,412,419 dated Feb. 20, 2007.

(Continued)

*Primary Examiner* — Cao "Kevin" Nguyen
(74) *Attorney, Agent, or Firm* — Yee & Associates, P.C.; Mark C. Vallone

(57) ABSTRACT

The present invention provides a method, apparatus, and computer instructions for organizing threads in an instant messaging session. Instant messages are received from a list of contacts. Each of these messages are stored in a set of folders, wherein each folders in the set of folders stores messages for a contact in the number of contacts. Each file is linked for access though a graphical user interface. Message threads are handled by displaying a primary dialog window, wherein the primary dialog window includes an ongoing conversation pane and an outgoing message pane. Responsive to a user input identifying a new thread, a secondary dialog window is displayed, wherein the secondary dialog window includes an ongoing conversation pane and an outgoing message pane. Responses to outgoing messages sent from the outgoing message pane are displayed in the primary dialog window in the ongoing conversation pane in the primary dialog window. Responses to outgoing messages sent from the outgoing message pane in the secondary dialog window are displayed in the ongoing conversation pane in the secondary dialog window, wherein the primary dialog window and the secondary dialog window.

22 Claims, 6 Drawing Sheets

U.S. PATENT DOCUMENTS

| | | |
|---|---|---|
| 6,832,245 B1 | 12/2004 | Isaacs et al. |
| 6,961,720 B1 | 11/2005 | Nelken |
| 6,964,040 B2 | 11/2005 | Osborn |
| 6,981,223 B2 | 12/2005 | Becker et al. |
| 7,007,085 B1 | 2/2006 | Malik |
| 7,016,978 B2 | 3/2006 | Malik et al. |
| 7,039,677 B2 | 5/2006 | Fitzpatrick et al. |
| 7,099,855 B1 | 8/2006 | Nelken et al. |
| 7,121,003 B2 | 10/2006 | Yasumura et al. |
| 7,124,123 B1 | 10/2006 | Roskind et al. |
| 7,124,372 B2 | 10/2006 | Brin |
| 7,142,664 B2 | 11/2006 | Seligmann |
| 7,174,453 B2 | 2/2007 | Lu |
| 7,185,057 B2 | 2/2007 | Brown et al. |
| 7,200,634 B2 * | 4/2007 | Mendiola et al. ............ 709/204 |
| 7,200,635 B2 | 4/2007 | Yashchin et al. |
| 7,383,307 B2 | 6/2008 | Kirkland et al. |
| 7,475,110 B2 | 1/2009 | Kirkland et al. |
| 7,480,696 B2 | 1/2009 | Kirkland et al. |
| 2001/0003202 A1 | 6/2001 | Mache et al. |
| 2002/0007398 A1 | 1/2002 | Mendiola et al. |
| 2002/0082484 A1 | 6/2002 | Baba et al. |
| 2002/0083134 A1 | 6/2002 | Bauer, Jr. et al. |
| 2002/0087649 A1 | 7/2002 | Horvitz |
| 2003/0009495 A1 | 1/2003 | Adjaoute |
| 2003/0018726 A1 | 1/2003 | Low et al. |
| 2003/0023684 A1 | 1/2003 | Brown et al. |
| 2003/0045311 A1 | 3/2003 | Larikka et al. |
| 2003/0046421 A1 | 3/2003 | Horvitz et al. |
| 2003/0131055 A1 | 7/2003 | Yashchin et al. |
| 2003/0131064 A1 | 7/2003 | Bell, III et al. |
| 2004/0024822 A1 * | 2/2004 | Werndorfer et al. ......... 709/206 |
| 2004/0039786 A1 | 2/2004 | Horvitz et al. |
| 2004/0078445 A1 | 4/2004 | Malik |
| 2004/0143636 A1 | 7/2004 | Horvitz et al. |
| 2004/0158610 A1 | 8/2004 | Davis et al. |
| 2004/0181577 A1 | 9/2004 | Skurikhin et al. |
| 2005/0108332 A1 | 5/2005 | Vaschillo et al. |
| 2005/0228864 A1 | 10/2005 | Robertson |
| 2006/0248150 A1 | 11/2006 | Chaar et al. |
| 2007/0005703 A1 | 1/2007 | Vesterinen |
| 2008/0183832 A1 | 7/2008 | Kirkland et al. |
| 2008/0250336 A1 | 10/2008 | Gusler et al. |
| 2009/0083389 A1 | 3/2009 | Kirkland et al. |
| 2009/0100141 A1 | 4/2009 | Kirkland et al. |

OTHER PUBLICATIONS

USPTO final office action for U.S. Appl. No. 10/427,137, U.S. Patent 7,412,419 dated Jul. 16, 2007.

USPTO notice of allowance for U.S. Appl. No. 10/427,137, U.S. Patent 7,412,419 dated Apr. 9, 2008.

USPTO notice of allowance for U.S. Appl. No. 12/144,373, U.S. Patent 7,693,951 dated Oct. 21, 2009.

USPTO notice of allowance for U.S. Appl. No. 12/144,373, U.S. Patent 7,693,951 dated Nov. 19, 2009.

* cited by examiner

METHOD AND APPARATUS FOR ENHANCING INSTANT MESSAGING SYSTEMS This application is a divisional of application Ser. No. 10/427,137, filed Apr. 30, 2003, status allowed.

BACKGROUND OF THE INVENTION

1. Technical Field

The present invention relates generally to an improved data processing system and in particular, to a method, apparatus, and computer instructions for processing and displaying messages. Still more particularly, the present invention provides an improved method, apparatus, and computer instructions for enhancements in instant messaging systems.

2. Description of Related Art

Instant messaging is an online chat medium, allowing users to communicate with each other and collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate a text conversation with colleagues or customers when a desired contact becomes available. Millions of users communicate using instant messaging systems every day. With instant messaging becoming an important part of a both personal and business communications, functionality and usability enhancements are important to the continued success of this type of communication tool.

Legacy instant messaging applications, however, include flaws which should be corrected for these applications to continue to be popular as a communications mechanism. One flaw recognized by the present invention is that a limited facility is present in existing instant messaging applications for managing and processing stored chat files. Virtually all legacy chat systems only have a default folder in which all of the recorded chat sessions are dropped into this folder. A user wishing to go back and view a particular chat session is required to go back and browse through many unrelated recorded chat sessions stored in this folder. These chat sessions are stored in files, which may be viewed based on date and time within the common folder. Having to browse through all of these files makes the present mechanism for storing chat sessions inefficient and unorganized. To locate a particular chat session, a user with the presently available legacy instant messaging systems is required to know where the default chat session folder is located. After identifying the location, the user must use a file viewing program to locate the folder and search for the desired chat session. These steps are inefficient and cumbersome for identifying a stored session file.

Further, as the number of chat sessions stored in message files become more voluminous, identifying and locating a particular chat session or thread becomes cumbersome with all of these files being located in a single default folder. In some cases, this folder may contain hundreds of threads or chat sessions. A chat session, as used herein, includes all conversation that occurs after an initiation of a conversation between two individuals or among a group of individuals. A thread is a subset of the chat session in which a user has deemed it necessary to split this portion of the chat session apart from the rest of the session.

Another shortfall recognized by the present invention is an inability of a user to determine which replies belong to which questions or comments when multiple communications threads are occurring. Currently, multiple conversation threads must be viewed and managed through a single window pane in legacy instant messaging systems. For example, a user may be utilizing an instant messaging session to talk to the user's manager about a particular contract and when the user remembers he needs to ask a completely unrelated question, the user is forced to insert this unrelated question into the current conversation thread in the window or wait until the current thread has completed. If, by waiting for the current thread to complete, the user may not remember the current topic.

Therefore, it would be advantageous to have an improved method, apparatus, and computer instructions for managing communications in instant messaging systems.

SUMMARY OF THE INVENTION

The present invention provides a method, apparatus, and computer instructions for organizing threads in an instant messaging session. Instant messages are received from a list of contacts. Each of these messages are stored in a set of folders, wherein each folders in the set of folders stores messages for a contact in the number of contacts. Each file is linked for access though a graphical user interface. Message threads are handled by displaying a primary dialog window, wherein the primary dialog window includes an ongoing conversation pane and an outgoing message pane. Responsive to a user input identifying a new thread, a secondary dialog window is displayed, wherein the secondary dialog window includes an ongoing conversation pane and an outgoing message pane. Responses to outgoing messages sent from the outgoing message pane are displayed in the primary dialog window in the ongoing conversation pane in the primary dialog window. Responses to outgoing messages sent from the outgoing message pane in the secondary dialog window are displayed in the ongoing conversation pane in the secondary dialog window, wherein the primary dialog window and the secondary dialog window.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
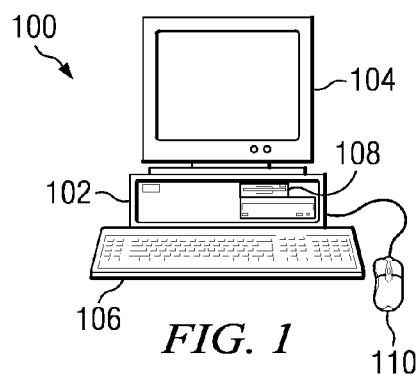
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
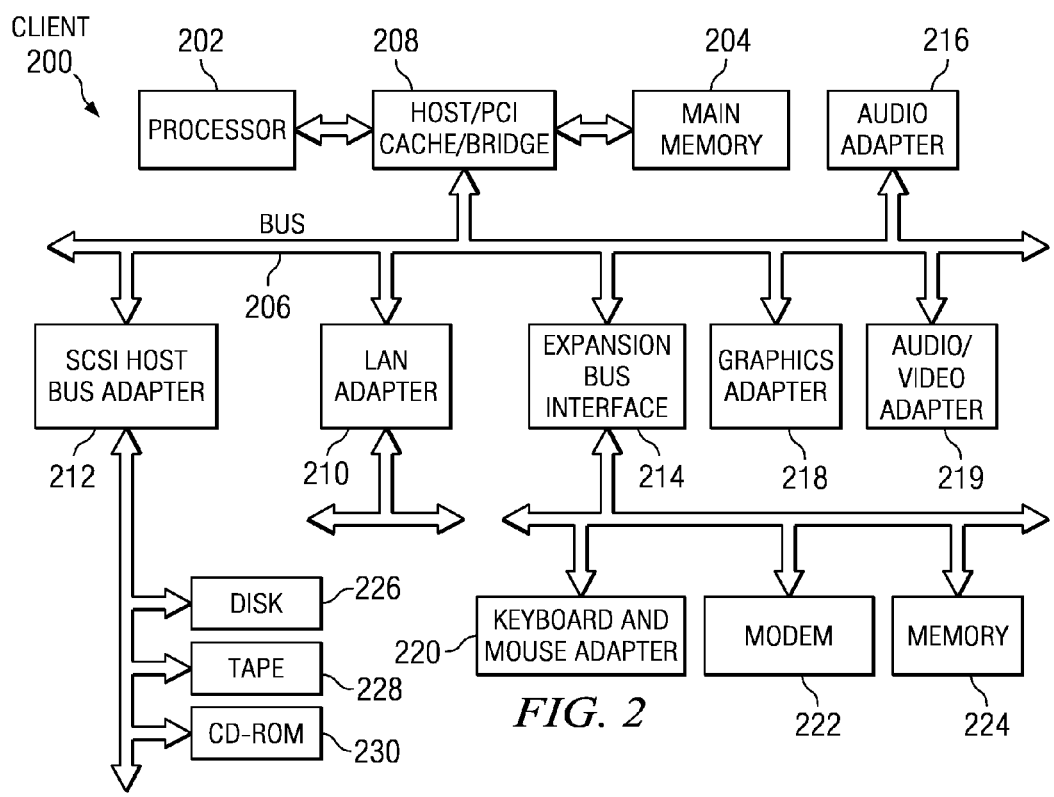
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

The present invention provides an improved method, apparatus, and computer instructions for processing messages in an instant messaging system. This mechanism overcomes problems with the storing of recorded chat sessions and with interrupting the flow of threads. The mechanism of the present invention provides an improved system for storing and managing chat session thread files. The voluminous amounts of message threads that may be stored are addressed in a manner that reduces or minimizes any cumbersomeness in locating a stored message file. The mechanism of the present invention provides a system in which chat files for a particular user are saved in association with that user. The files may be stored in folders associated with each of the users, or each file may be tagged in some manner to associate those files with that user. Additionally, the instant messaging application is enhanced to use a link or some other graphic control to allow the user to save a chat session to use a specific user, as well as using graphical controls to access previously saved chat sessions. These links or graphical controls are associated with users on the user list.

With respect to managing threads in windows, the mechanism of the present invention provides a system in which a new instant messaging window will be initiated each time a new thread occurs. In this manner, each thread has a separate window, thus reducing confusion between different threads.

Figure 3:
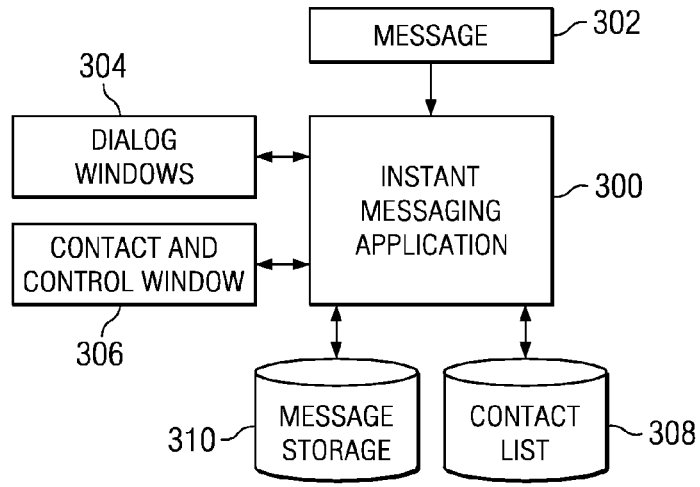
FIG. 3 is a diagram illustrating components used in an improved instant messaging system in accordance with a preferred embodiment of the present invention.

Turning next to FIG. 3, a diagram illustrating components used in an improved instant messaging system is depicted in accordance with a preferred embodiment of the present invention. These components may be implemented in a data processing system, such as data processing system 200 in FIG. 2.

In the depicted example, instant messaging application 300 processes messages, such as message 302 received from users located on remote data processing systems. As messages are received, these messages are presented in dialog windows 304. Additionally, dialog windows 304 provide an interface for user input to send messages to other users. Contact and control window 306 is presented by instant messaging application 300 to provide the user with a list of user names, as well as other information, such as, for example, identifying other users that are currently online. Contact and control window 306 also provides an interface to allow the user to set different preferences. For example, the user may set passwords required to access different names used in instant messaging sessions. Further, a user may employ contact and control window 306 to set other preferences, such as colors and fonts used in instant messaging application 300.

Further, the list of names presented by contact and control window 306 are stored in contact list 308 in these examples. Additional user names may be added or deleted from contact list 308. This contact list is employed in presenting the list of names within contact and control window 306.

A user may select a graphical control or select a link associated with a user name presented in the list of user names in contact and control window 306 to store the session for that user name in message storage 310. In the depicted examples, instant messaging application 300 stores chat sessions for different users in different folders within message storage 310. Alternatively, the different files for storing chat sessions for different users may be tagged with identifiers indicating the particular user name that is associated with the chat session. These indicators could be placed within the file or within the file name depending on the particular application.

By selecting a user name from contact and control window 306 or a control or link associated with that user name, a user may cause instant messaging application 300 to store that session in a file in association with that user name. By using the same link or graphical control or a different one associated with that user name, the user may retrieve prior chat sessions stored for that particular user name.

Additionally, instant messaging application 300 provides a mechanism for handling multiple threads between two users in dialog windows 304. This mechanism provides a graphical control within a presently used window pane between two users. This control may be selected to initiate the presentation of a second window to allow for a second discussion or thread discussed between those two users. In this manner, ambiguity as to which question, answer, and/or comment is part of which discussion thread is eliminated.

Figure 4:
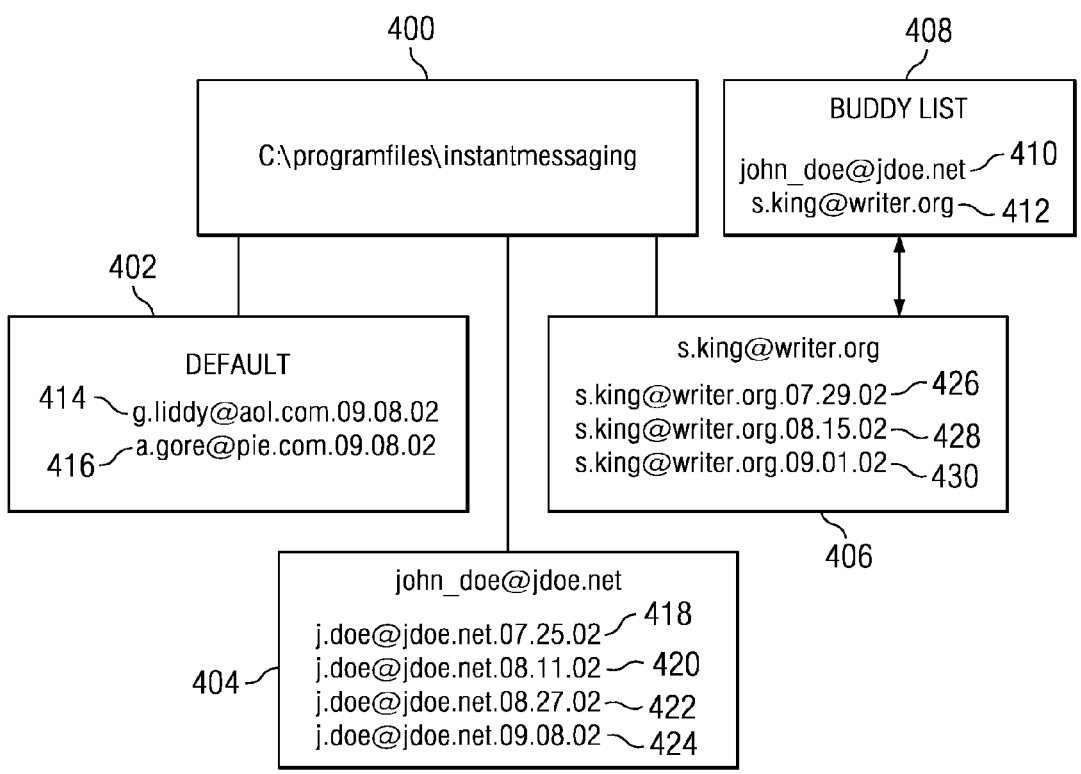
FIG. 4 is a diagram illustrating a hierarchical storage system for storing chat sessions or threads in accordance with a preferred embodiment of the present invention.

Turning next to FIG. 4, a diagram illustrating a hierarchical storage system for storing chat sessions or threads is depicted in accordance with a preferred embodiment of the present invention. In this example, folder 400 is a top level folder under which different folders for different users are located. In this example, these folders include the default folder 402, john_doe@jdoe.net folder 402, and s.king@writer.net folder 406. In each of these folders, chat sessions or threads are stored for particular users.

In this example, default folder 402 is a folder in which messages for users with no entries in a buddy list, such as buddy list 408 are found. Buddy list 408 is an example of contacts from a contact list, such as contact list 308 in FIG. 3 presented in contact control window 306 in FIG. 3. In this example, entry 410 in buddy list 408 corresponds to john_doe@jdoe.net folder 402, while entry 412 in buddy list 408 corresponds to s.king@writer.net folder 406.

When messages are saved for a particular entry on buddy list 408, these messages are stored in one of default folder 402, john_doe@jdoe.net folder 402, or s.king@writer.net folder 406. In these examples, files 414 and 416 are stored in default folder 402. These files are for chat sessions for user not found on buddy list 408. Files 418, 420, 422, and 424 are stored in john_doe@jdoe.net folder 402 for chat sessions stored in association with entry 410 in buddy list 408. Chat sessions for entry 412 are stored in s.king@writer.net folder 406. In this example, these chat sessions are stored in 426, 428, and 430. In these examples, each of the files is named using the name on the buddy list, as well as including a date on which the chat session was stored.

Previously stored chat session or threads may be accessed in these examples by selecting a hyperlink associated with the name for entry 410 or 412 as presented in buddy list 408. In these examples, the user input is a right click on the name presented in buddy list 408. When such an input occurs, the different files stored in the folder are presented to the user such that the user may select one of the files for viewing. In this manner, the cumbersome and inefficient mechanism provided in current IM applications is avoided through the association of chat sessions with user names on a contact list. This mechanism simplifies the process of storing and retrieving chat sessions.

Figure 5:
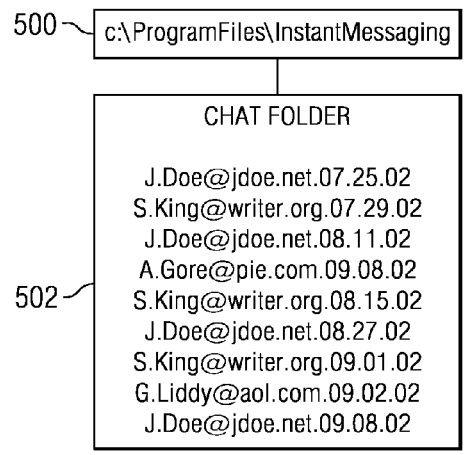
FIG. 5 is a diagram illustrating a message storage system currently used in instant messaging applications is depicted.

With reference now to FIG. 5, a diagram illustrating a message storage system currently used in instant messaging applications is depicted. In this example, folder 500 is a top level folder under which all files containing chat sessions are stored. In this example, chat folder 502 contains files for each and every recorded message for all users. As can be seen, this organization of files is more cumbersome and inefficient for a user to access. The inefficiency and cumbersomeness increases as the number of files increases in chat folder 502. Some users may have hundreds of saved chat sessions.

Further, the inefficiency in the presently available instant messaging applications is further increased due to the fact that the user must manually locate chat folder 502. For example, in an operating system, such as Windows XP, a user must double click an icon labeled "my computer". Windows XP is a trademark of Microsoft Corporation. Thereafter, the user would select "C:\drive" then double click an icon labeled "program files". Thereafter, the user would double click a folder called "instant messaging" and then double click a folder labeled "chat folder". At this point, the user must search through all of the entries to identify the desired session file, and then identify that session file. This process requires a number of user inputs and assumes that the user knows the location of the files. No link or graphical control is presently available in the buddy list or elsewhere in the instant messaging application to allow the quick access as illustrated with respect to the hierarchical storage system for storing messages illustrated in FIG. 4 above.

Figure 6:
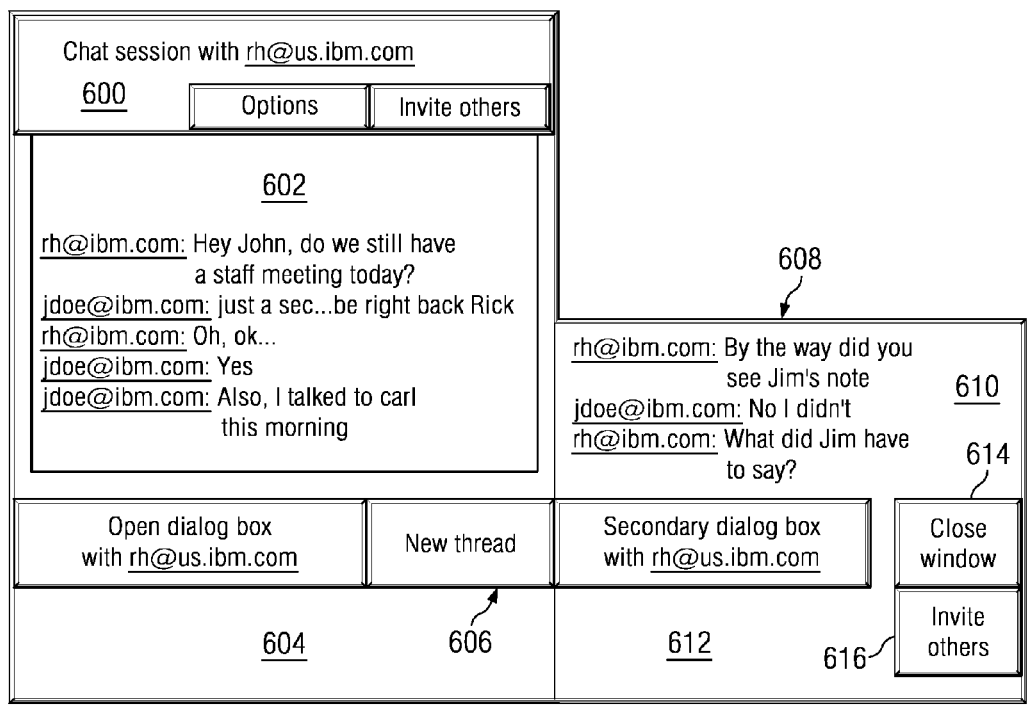
FIG. 6 is a diagram of windows for providing enhanced instant messaging thread control in accordance with a preferred embodiment of the present invention.

Turning next to FIG. 6, a diagram of windows for providing enhanced instant messaging thread control is depicted in accordance with a preferred embodiment of the present invention. In this example, dialog box 600 is a primary dialog box displaying all communication for a chat session. In this example, the discussion thread is located in ongoing conversation pane 602. This section shows communications from both parties. Outgoing message pane 604 contains input from the user that is sent to the other user at the remote data processing system. Outgoing message pane 604 is used to hold a current reply, but is emptied as soon as that reply is sent to the recipient. According to the present invention, new thread button 606 is included to allow for the management of more than one thread within a chat session.

In response to selecting new thread button 606, window 608 is presented to the user. In this second window, a second discussion thread is presented in ongoing message pane 610 of window 608. The user input is entered into outgoing message pane 612. Outgoing message pane 612 is used to hold a current reply, but is emptied as soon as that reply is sent to the recipient. This secondary window, window 608 may be closed using closed window button 614. Additionally, other users may be invited to the chat session by selecting the invite others button 616. This button provides a feature allowing either party in a chat session thread to invite others on the user's buddy list to join a thread. In this instance, the mechanism of the present invention will store the conversation in both locations.

As can be seen, the window mechanism of the present invention illustrated in FIG. 6 provides an ability to separate different threads within a chat session into different windows. In these examples, when new thread button 606 is selected, this results in a message being sent to the other instant messaging program on the remote data processing system to open a new window for the second thread. Of course, other windows may be opened for other threads, even though only two windows are illustrated in FIG. 6.

Figure 7:
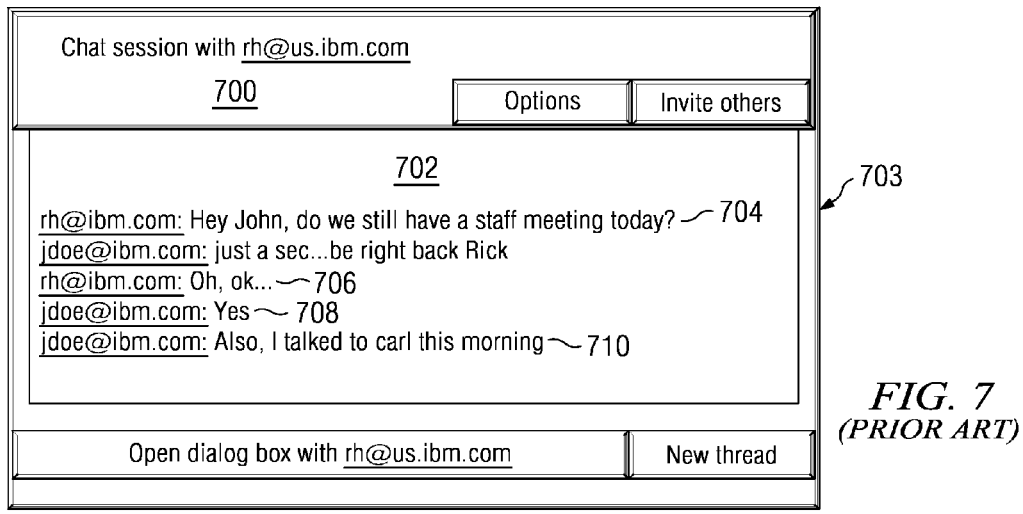
FIG. 7 is a diagram illustrating a legacy instant messaging window without thread control.

Next, FIG. 7 is a diagram illustrating a legacy instant messaging window without thread control. In this example, window 700 includes multiple threads in ongoing message pane 702. Outgoing message pane 703 is used to hold a current reply and is emptied as soon as that reply is sent to the recipient. These different threads correspond to the different ones organized in windows 600 and 608 in FIG. 6. In this example, line 704 relates to the first discussion thread, and line 706 relates to a second discussion thread. In this example, it is unclear as to whether line 708 or if line 710 belong to the first or second discussion thread. Line 706 is displayed in a second window, window 608 in FIG. 6, as well as other lines that relate to the same thread. Thus, in comparing window 700 in FIG. 7 to windows 600 and 608 in FIG. 6, the mechanism of the present invention allows for organization of different threads and the ability to avoid ambiguity as to which question, answer, and/or comment is part of which discussions thread.

Figure 8:
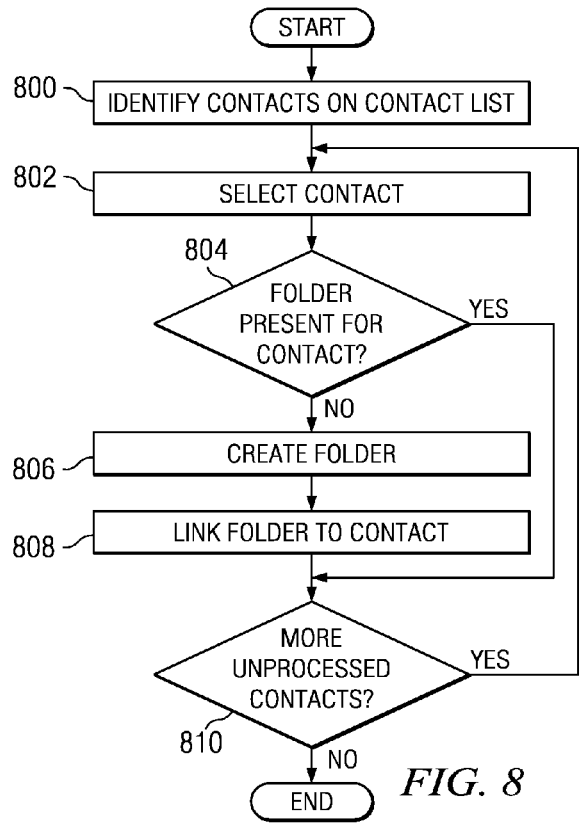
FIG. 8 is a flowchart of a process for creating folders and links to contacts on a contact list in accordance with a preferred embodiment of the present invention.

Turning next to FIG. 8, a flowchart of a process for creating folders and links to contacts on a contact list in accordance with a preferred embodiment of the present invention. The process listed in FIG. 8 may be implemented in an application, such as instant messaging application 300 in FIG. 3.

The process begins by identifying contacts on the contact list (step 800). This contact list may be, for example, contact list 308 in FIG. 3. A contact is selected from the contact list for processing (step 802). A determination is made as to whether a folder is present for the contact. If a folder is not present, a folder is created (step 806). This folder may be a folder such as john_doe@jdoe.net folder 402 in FIG. 4. After the folder is created, this folder is linked to the contacts (step 808). This link allows for the folder to be accessed if a link or graphical control associated with the contact presented to the user is selected. Thereafter, a determination is made as to whether additional unprocessed contacts are present in the contact list (step 810).

If additional unprocessed contacts are present, the process returns to step 802. Otherwise, the process terminates. With reference again to step 804, if a folder is present for the selected contact, the process proceeds to step 810 as described above.

Figure 9:
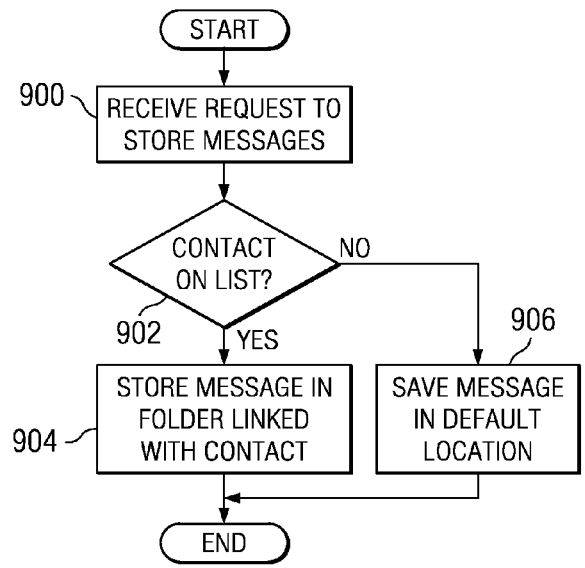
FIG. 9 is a flowchart of a process for saving messages from a chat session in accordance with a preferred embodiment of the present invention.

Turning next to FIG. 9, a flowchart of a process for saving messages from a chat session is depicted in accordance with a preferred embodiment of the present invention. The process listed in FIG. 9 may be implemented in an application, such as instant messaging application 300 in FIG. 3.

The process begins by receiving a request to store messages (step 900). This request is initiated by a user selecting an option or some other control to store messages from a chat session. A determination is made as to whether the contact for which these messages are stored on the contact list (step 902). If the contact is on the list, the messages are stored in a folder linked with the contacts (step 904), with the process terminating thereafter. Otherwise, the message is saved in a default location (step 906), with the processing terminating thereafter.

Depending on the particular implementation, instead of saving the message on a specific location, the user may be asked to add the name to the contact list. If such a procedure is used, then a new folder is created and linked to the new contact.

Figure 10:
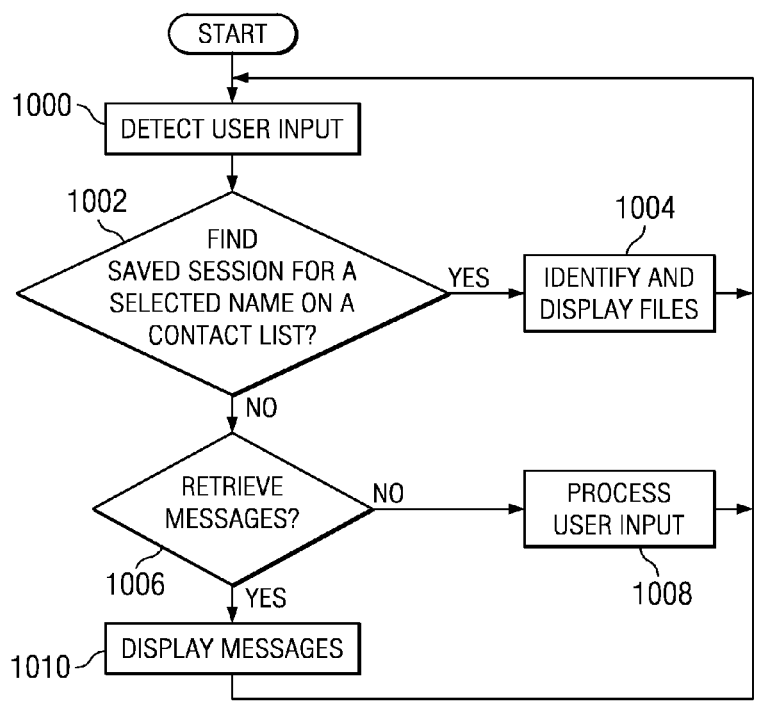
FIG. 10 is a flowchart of a process for retrieving messages in accordance with a preferred embodiment of the present invention.

With reference now to FIG. 10, a flowchart of a process for retrieving messages is depicted in accordance with a preferred embodiment of the present invention. The process listed in FIG. 10 may be implemented in an application, such as instant messaging application 300 in FIG. 3. The process begins by detecting a user input (step 1000). Upon detecting the user input, a determination is made as to whether the user input is to find saved sessions for a selected name on a contact list (step 1002). This type of user input occurs when a user selects a link or graphical control associated with a name on a contact list. If the user input is to find saved sessions for a selected name on a contact list, these files are identified and displayed to the user (step 1004), with the process then returning to step 1000 to determine another user input.

With reference again to step 1002, if the user input is not to find a saved session for a selected name on a contact list, a determination is made as to whether the user input is to retrieve messages for a particular displayed file (step 1006). If the user input is to retrieve messages for a particular displayed file, those messages are then displayed (step 1008), with the process then returning to step 1000 as described above. If the user input is not to retrieve messages, this input is then processed depending on the identification of this input (step 1010), with the process then returning to step 1000 as described above. Step 1010 is provided for other user input to initiate other processes currently available in an instant messaging application.

Figure 11:
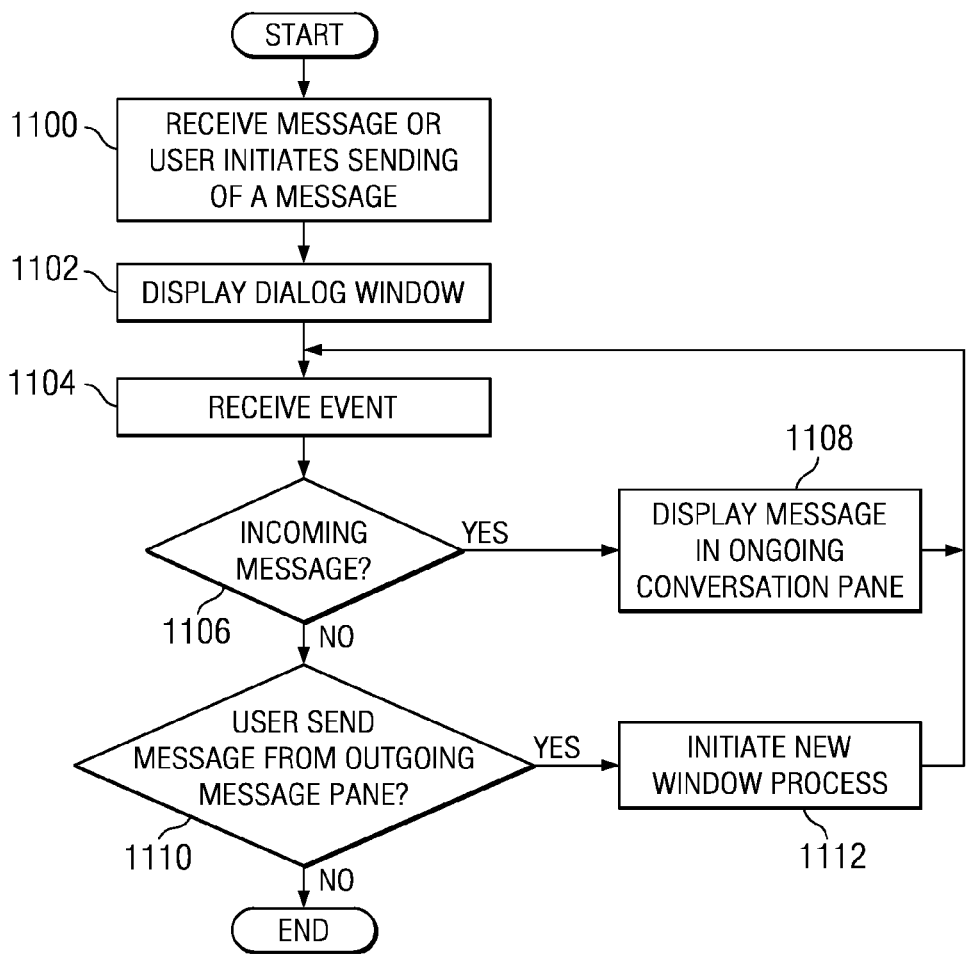
FIG. 11 is a flowchart of a process for handling multiple threads in a chat session in accordance with a preferred embodiment of the present invention.

With reference now to FIG. 11, a flowchart of a process for handling multiple threads in a chat session is depicted in accordance with a preferred embodiment of the present invention. The process listed in FIG. 11 may be implemented in an application, such as instant messaging application 300 in FIG. 3. In particular, this process illustrated in FIG. 11 is a window process initiated for each thread in a session between two users.

The process begins when a message is received by the user or the user initiates sending a message (step 1100). A dialog window is presented (step 1102). This dialog window is a window, such as dialog window 600 in FIG. 6. An event is then received (step 1104). A determination is then made as to whether the event is an incoming message (step 1106). If the event is an incoming message, this message is displayed in an ongoing conversation pane (step 1108), with the processing returning to step 1104 as described above. This pane is a pane, such as ongoing conversation pane 602 in FIG. 6.

With reference again to step 1106, if the message is not an incoming message, a determination is made as to whether the event is a user input sending a message from the outgoing message pane (step 1110). If the message is one sent by the user, this text is displayed as described in step 1108. Otherwise, the user input is the selection of a new thread button, such as new thread button 606 in FIG. 6. In this instance, a new dialog window process is initiated (step 1112), with the process then returning to step 1104, as described above. This new window process is a new process such as one described here in FIG. 11. This process will control the sending and receiving of messages in another window, such as window 608 in FIG. 6.

Thus, the present invention provides an improved method, apparatus, and computer instructions for enhancing instant messaging systems. The mechanism of the present invention provides this enhanced system through a hierarchical storage system in which files are linked to names in a contact list, along with a windowing system for handling multiple threads in a session between two users. With the storage system, messages for a particular name on the contact list are stored in a folder associated with that name. In this manner, each name in the contact list has a separate folder. The folder is linked to the names such that a graphical control or link may be selected to access these folders without requiring the user to traverse different folders in a tree and without having to know the location in which these files are stored. Further, the windowing system of the present invention allows for different threads between two users to be presented in different windows to allow for the threads to be kept separate and to avoid confusion as to what text or messages are associated with what thread.

It is important to note that while the present invention has been described in the context of a fully functioning data processing system, those of ordinary skill in the art will appreciate that the processes of the present invention are capable of being stored in a computer readable data storage medium of instructions and a variety of forms and that the present invention applies equally regardless of the particular type of data storage media actually used to carry out the distribution. Examples of computer readable data storage media include recordable-type media, such as a floppy disk, a hard disk drive, a RAM, CD-ROMs, and DVD-ROMs. The computer readable data storage media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for handling message threads, the method comprising the steps of:

a computer displaying a primary dialog window, wherein the primary dialog window includes a first ongoing conversation pane and a first outgoing message pane;

the computer displaying, in the primary dialog window, a first discussion between a first party and a second party during a chat session between the first party and the second party;

during the chat session, the computer receiving an indication, from the first party, of a new thread, wherein the new thread is a subset of the chat session, and wherein the new thread is a second discussion between the first party and the second party;

after receiving the indication, the computer displaying a secondary dialog window, wherein the secondary dialog window includes a second ongoing conversation pane and a second outgoing message pane;

the computer displaying responses to first outgoing messages sent from the first outgoing message pane in the first ongoing conversation pane; and the computer displaying responses to second outgoing messages sent from the second outgoing message pane in the second ongoing conversation pane.

2. The method of claim 1 further comprising the step of:

after a selection of a contact from a list of contacts, the computer displaying messages for the contact.

3. The method of claim 1 further comprising the step of:

the computer storing messages associated with a contact from a list of contacts in a folder;

the computer linking the folder to the contact; and the computer providing the first party access to the messages in response to a selection of the contact.

4. The method according to claim 1 further comprising the step of:

after receiving the indication, the computer sending a message to an instant messaging program on a remote computer being used by the second party to open a window for the new thread.

5. The method according to claim 1 further comprising the steps of:

the computer displaying a close button in the secondary dialog window;

the computer receiving a selection of the close button; and after receiving the selection of the close button, the computer closing the secondary dialog window.

6. The method according to claim 1 further comprising the steps of:

the computer displaying an invite others button in the secondary dialog window;

the computer receiving a selection of the invite others button; and after receiving the selection of the invite others button, the computer inviting a third party on a buddy list of the first party to join the new thread.

7. The method according to claim 1, wherein the new thread comprises the second outgoing messages sent from the second outgoing message pane and the responses to the second outgoing messages.

8. A computer system for handling message threads, the computer system comprising:

one or more processors, one or more computer-readable memories and one or more computer-readable tangible storage devices;

program instructions, stored on at least one of the one or more storage devices for execution by at least one of the one or more processors via at least one of the one or more memories, to display a primary dialog window, wherein the primary dialog window includes a first ongoing conversation pane and a first outgoing message pane;

program instructions, stored on at least one of the one or more storage devices for execution by at least one of the one or more processors via at least one of the one or more memories, to display, in the primary dialog window, a first discussion between a first party and a second party during a chat session between the first party and the second party;

program instructions, stored on at least one of the one or more storage devices for execution by at least one of the one or more processors via at least one of the one or more memories, to, during the chat session, receive an indication, from the first party, of a new thread, wherein the new thread is a subset of the chat session, and wherein the new thread is a second discussion between the first party and the second party;

program instructions, stored on at least one of the one or more storage devices for execution by at least one of the one or more processors via at least one of the one or more memories, to, after receiving the indication, display a secondary dialog window, wherein the secondary dialog window includes a second ongoing conversation pane and a second outgoing message pane;

program instructions, stored on at least one of the one or more storage devices for execution by at least one of the one or more processors via at least one of the one or more memories, to display responses to first outgoing messages sent from the first outgoing message pane in the first ongoing conversation pane; and program instructions, stored on at least one of the one or more storage devices for execution by at least one of the one or more processors via at least one of the one or more memories, to display responses to second outgoing messages sent from the second outgoing message pane in the second ongoing conversation pane.

9. The computer system of claim 8 further comprising:
program instructions, stored on at least one of the one or more storage devices for execution by at least one of the one or more processors via at least one of the one or more memories, to, after a selection of a contact from a list of contacts, display messages for the contact.

10. The computer system of claim 8 further comprising:
program instructions, stored on at least one of the one or more storage devices for execution by at least one of the one or more processors via at least one of the one or more memories, to store messages associated with a contact from a list of contacts in a folder;
program instructions, stored on at least one of the one or more storage devices for execution by at least one of the one or more processors via at least one of the one or more memories, to link the folder the contact; and
program instructions, stored on at least one of the one or more storage devices for execution by at least one of the one or more processors via at least one of the one or more memories, to provide to the first party access to the messages in response to a selection of the contact.

11. The computer system according to claim 8 further comprising:
program instructions, stored on at least one of the one or more storage devices for execution by at least one of the one or more processors via at least one of the one or more memories, to display a new thread button in the primary dialog window; and program instructions, stored on at least one of the one or more storage devices for execution by at least one of the one or more processors via at least one of the one or more memories, to receive a selection of the new thread button, wherein the indication is the selection of the new thread button.

12. The computer system according to claim 8 further comprising:
program instructions, stored on at least one of the one or more storage devices for execution by at least one of the one or more processors via at least one of the one or more memories, to, after receiving the indication, send a message to an instant messaging program on a remote computer being used by the second party to open a window for the new thread.

13. The computer system according to claim 8 further comprising:
program instructions, stored on at least one of the one or more storage devices for execution by at least one of the one or more processors via at least one of the one or more memories, to display a close button in the secondary dialog window;
program instructions, stored on at least one of the one or more storage devices for execution by at least one of the one or more processors via at least one of the one or more memories, to receive a selection of the close button; and
program instructions, stored on at least one of the one or more storage devices for execution by at least one of the one or more processors via at least one of the one or more memories, to, after receiving the selection of the close button, close the secondary dialog window.

14. The computer system according to claim 8 further comprising:
program instructions, stored on at least one of the one or more storage devices for execution by at least one of the one or more processors via at least one of the one or more memories, to display an invite others button in the secondary dialog window;
program instructions, stored on at least one of the one or more storage devices for execution by at least one of the one or more processors via at least one of the one or more memories, to receive a selection of the invite others button; and
program instructions, stored on at least one of the one or more storage devices for execution by at least one of the one or more processors via at least one of the one or more memories, to, after receiving the selection of the invite others button, invite a third party on a buddy list of the first party to join the new thread.

15. The computer system according to claim 8, wherein the new thread comprises the second outgoing messages sent from the second outgoing message pane and the responses to the second outgoing messages.

16. A computer program product for handling message threads, the computer program product comprising:
one or more computer-readable tangible storage devices;
program instructions, stored on at least one of the one or more storage devices, to display a primary dialog window, wherein the primary dialog window includes a first ongoing conversation pane and a first outgoing message pane;
program instructions, stored on at least one of the one or more storage devices, to display, in the primary dialog window, a first discussion between a first party and a second party during a chat session between the first party and the second party;

program instructions, stored on at least one of the one or more storage devices, to, during the chat session, receive an indication, from the first party, of a new thread, wherein the new thread is a subset of the chat session, and wherein the new thread is a second discussion between the first party and the second party;

program instructions, stored on at least one of the one or more storage devices, to, after receiving the indication, display a secondary dialog window, wherein the secondary dialog window includes a second ongoing conversation pane and a second outgoing message pane;

program instructions, stored on at least one of the one or more storage devices, to display responses to first outgoing messages sent from the first outgoing message pane in the first ongoing conversation pane; and program instructions, stored on at least one of the one or more storage devices, to display responses to second outgoing messages sent from the second outgoing message pane in the second ongoing conversation pane.

17. The method according to claim 1 further comprising the steps of:
the computer displaying a new thread button in the primary dialog window; and
the computer receiving a selection of the new thread button, wherein the indication is the selection of the new thread button.

18. The computer program product according to claim 16 further comprising:
program instructions, stored on at least one of the one or more storage devices, to display a new thread button in the primary dialog window; and
program instructions, stored on at least one of the one or more storage devices, to receive a selection of the new thread button, wherein the indication is the selection of the new thread button.

19. The computer program product according to claim 16 further comprising:
program instructions, stored on at least one of the one or more storage devices, to, after receiving the indication, send a message to an instant messaging program on a remote computer being used by the second party to open a window for the new thread.

20. The computer program product according to claim 16 further comprising:
program instructions, stored on at least one of the one or more storage devices, to display a close button in the secondary dialog window;
program instructions, stored on at least one of the one or more storage devices, to receive a selection of the close button; and
program instructions, stored on at least one of the one or more storage devices, to, after receiving the selection of the close button, close the secondary dialog window.

21. The computer program product according to claim 16 further comprising:
program instructions, stored on at least one of the one or more storage devices, to display an invite others button in the secondary dialog window;
program instructions, stored on at least one of the one or more storage devices, to receive a selection of the invite others button; and
program instructions, stored on at least one of the one or more storage devices, to, after receiving the selection of the invite others button, invite a third party on a buddy list of the first party to join the new thread.

22. The computer program product according to claim 16, wherein the new thread comprises the second outgoing messages sent from the second outgoing message pane and the responses to the second outgoing messages.

* * * * *